UNITED STATES PATENT OFFICE.

HARRY WILLIAMS CHARLTON, OF JONES POINT, NEW YORK, ASSIGNOR TO KAOLIN PRODUCTS CORPORATION, A CORPORATION OF VIRGINIA.

PROCESS OF DECOMPOSING SILICATES.

1,234,626. Specification of Letters Patent. Patented July 24, 1917.

No Drawing. Application filed December 8, 1916. Serial No. 135,759.

*To all whom it may concern:*

Be it known that I, HARRY WILLIAMS CHARLTON, a citizen of Canada, residing at Jones Point, in the county of Rockland and State of New York, have invented a new and useful Improvement in Processes of Decomposing Silicates, of which the following is a specification.

My invention consists in a method of obtaining potassium chlorid and a hydrous silicate by digesting finely ground feldspar in a solution of calcium chlorid and milk of lime at a temperature below 190 degrees centigrade, and at a pressure below 200 pounds. The duration of the digestion is from two to four hours. Other materials, such as leucite and glauconite, commonly known as greensand, may be employed in the place of the feldspar. The latter is especially suitable as it is easily mined and is found in the neighborhood of some large cities. It is also, considered from a chemical standpoint, less refractory than the alkali-carrying rocks.

Although it has been known for many years that potassium chlorid might be obtained from a moistened mixture of feldspar, calcium chlorid and lime on heating to 1100 degrees centigrade in an autoclave, I have discovered that if considerable water is present the reaction takes place at a comparatively low temperature and pressure.

The following is an example of my process. Equal weights of finely ground glauconite, and lime, and calcium chlorid equivalent chemically to the potassium content of the glauconite, are digested with five times their weight of water in an autoclave at a pressure of 150 pounds and a corresponding temperature for three hours. The mass is filtered and the potassium chlorid separated from any calcium chlorid present in the solution by evaporating and crystallizing. The insoluble silicates remaining on the filter are dried, mixed with sand and pressed and steamed to make brick.

The glauconite must in every case be finely ground, and it is preferable, although not absolutely essential, that it be submitted to a previous calcination.

Other chlorids, such as the chlorids of iron, may replace the calcium chlorid, and magnesium oxid may replace the lime. The choice in this case depends largely on the economic conditions.

I claim:—

1. A process of manufacturing potassium chlorid which comprises digesting an alkali-carrying silicious material with a solution of calcium chlorid and milk of lime at a temperature below 190 degrees centigrade and at a pressure below 200 pounds, for a period of from two to four hours, thereby obtaining potassium chlorid in solution, substantially as described.

2. A process of manufacturing potassium chlorid which comprises digesting glauconite, in the form of greensand, with a solution of calcium chlorid and milk of lime; thereby obtaining potassium chlorid in solution; substantially as described.

3. A process of manufacturing potassium chlorid which comprises digesting glauconite, in the form of greensand, with a solution of calcium chlorid and milk of lime at a pressure below 200 pounds, and at a temperature below 190 degrees centigrade for a period of from two to four hours, thereby obtaining potassium chlorid in solution; substantially as described.

HARRY WILLIAMS CHARLTON.

Witnesses:
WM. R. MASON,
H. R. MASON.